United States Patent
Silva et al.

(10) Patent No.: US 7,929,459 B2
(45) Date of Patent: Apr. 19, 2011

(54) METHOD AND APPARATUS FOR AUTOMATICALLY DETERMINING THE MANNER IN WHICH TO ALLOCATE AVAILABLE CAPITAL TO ACHIEVE A DESIRED LEVEL OF NETWORK QUALITY PERFORMANCE

(75) Inventors: Claudio Batista Silva, Atlanta, GA (US); Ali Jabbary, Roswell, GA (US); Rudy Hermond, Dallas, TX (US)

(73) Assignee: AT&T Mobility II LLC, Altanta, GA (US)

( * ) Notice: Subject to any disclaimer, the term of this patent is extended or adjusted under 35 U.S.C. 154(b) by 1172 days.

(21) Appl. No.: 10/967,940

(22) Filed: Oct. 19, 2004

(65) Prior Publication Data

US 2006/0083170 A1    Apr. 20, 2006

(51) Int. Cl.
*H04L 12/28* (2006.01)
(52) U.S. Cl. ......... 370/255; 370/328; 370/329; 370/386
(58) Field of Classification Search .................. 455/446; 370/252, 238, 255, 329, 328, 386
See application file for complete search history.

(56) References Cited

U.S. PATENT DOCUMENTS

| | | | | |
|---|---|---|---|---|
| 5,561,841 A * | 10/1996 | Markus | ......................... | 455/446 |
| 5,809,282 A * | 9/1998 | Cooper et al. | ................ | 709/226 |
| 5,826,218 A | 10/1998 | Khafizov et al. | | |
| 5,987,328 A * | 11/1999 | Ephremides et al. | ......... | 455/446 |
| 6,246,880 B1 * | 6/2001 | Iizuka | ........................... | 455/446 |
| 6,275,695 B1 | 8/2001 | Obhan | | |
| 6,336,035 B1 * | 1/2002 | Somoza et al. | ............... | 455/446 |
| 6,539,221 B1 * | 3/2003 | Vasudevan et al. | ........... | 455/423 |
| 6,636,721 B2 * | 10/2003 | Threadgill et al. | ........... | 455/12.1 |
| 6,647,275 B1 * | 11/2003 | Kobernat | ................... | 455/553.1 |
| 6,766,170 B1 * | 7/2004 | Aretz et al. | ..................... | 455/436 |
| 6,925,066 B1 * | 8/2005 | Chekuri et al. | ............... | 370/319 |
| 6,950,665 B2 * | 9/2005 | Swift et al. | ..................... | 455/501 |
| 7,142,868 B1 * | 11/2006 | Broyles et al. | ................ | 455/453 |
| 7,385,936 B2 * | 6/2008 | Shipman | ....................... | 370/254 |
| 7,418,376 B1 * | 8/2008 | Feldstein et al. | ................ | 703/21 |
| 7,561,532 B2 * | 7/2009 | Bossi et al. | ..................... | 370/255 |
| 7,561,876 B2 * | 7/2009 | Chiou et al. | .................. | 455/423 |
| 7,664,492 B1 * | 2/2010 | Lee et al. | ..................... | 455/424 |
| 7,768,968 B2 * | 8/2010 | Plehn et al. | .................... | 370/329 |
| 2003/0061017 A1 * | 3/2003 | Dotaro et al. | .................... | 703/14 |
| 2003/0190917 A1 * | 10/2003 | De Cambray-Mathan | ... | 455/446 |
| 2005/0243738 A1 * | 11/2005 | Zolfaghari | .................... | 370/254 |
| 2008/0109731 A1 * | 5/2008 | Chang et al. | .................. | 715/736 |

FOREIGN PATENT DOCUMENTS

WO    WO 96/24210    *   8/1996

OTHER PUBLICATIONS

Konstantinopoulou et al.;"Core Network Planning, Optimization and Forecasting in GSM/GPRS Networks"; 2000; IEEE; pp. 55-61.*
Marconi—Wireless Network Planning, http://wnp.marconi.com, 2002-2003.

* cited by examiner

*Primary Examiner* — Ricky Ngo
*Assistant Examiner* — Dewanda Samuel

(57) ABSTRACT

A method and apparatus for simulating a modification to or expansion of a communications network and for determining whether the simulated modified or expanded network meets cost criteria. First logic forecasts an increase in network traffic. Second logic simulates a modification to or expansion of the network based on the forecasted increase in network traffic and/or based on performance improvement criteria and/or based on coverage expansion criteria. Third logic determines whether the simulated modified or expanded network meets cost criteria.

20 Claims, 3 Drawing Sheets

METHOD AND APPARATUS FOR AUTOMATICALLY DETERMINING THE MANNER IN WHICH TO ALLOCATE AVAILABLE CAPITAL TO ACHIEVE A DESIRED LEVEL OF NETWORK QUALITY PERFORMANCE

BACKGROUND OF THE INVENTION

1. Field of Invention

The present invention is directed to wireless communications networks, and more particularly, to a system that automatically determines the manner in which available capital should be spent in order to achieve a given level of performance in a wireless network.

2. Description of Related Art

As wireless network subscriber bases grow, decisions must be made as to what changes need to be made to the network in order to meet growing demands. Changes to the network may include adding new equipment, such as a new cell site, for example, or making modifications to existing equipment, such as, for example, changing the azimuth of an antenna of an existing cell site. The cost of making a change will vary depending on the type of change that is made. For example, adding a new cell site may cost hundreds of thousands of dollars, whereas changing the azimuth of an existing cell site antenna may cost a few thousand dollars. Therefore, it is extremely important that the solution that is implemented be a cost effective solution and that it enable a desired or necessary level of network quality performance to be achieved.

Voice channel forecast (VCF) tools are used by network designers to project, or forecast, increases in network traffic that will occur as a result of increases in the number of subscribers using the network. The VCF tool is provided with financial information, such as subscriber sales information, for example, and network capacity information, such as the number of available channels of a cell site, for example. Based on this information, the VCF tool forecasts increases in network traffic for each sector of the network over a given period of time and determines whether or not the increases will exceed network capacity. Using these forecasts, designers use other tools to determine how the network can be modified or expanded to meet the forecasted increases in network traffic.

A tool known as an automatic cell planning (ACP) analyzer receives as its input a network traffic forecast generated by the VCF tool and an existing network configuration. The ACP analyzer processes this information and outputs the locations of any additional cell sites that need to be added to the network to meet the forecasted increased traffic demands. If the VCF tool indicates that network capacity for a given network sector will be exceeded by a particular amount, the ACP analyzer will determine the number of cell sites that need to be added to meet the increased demand. The ACP analyzer also determines whether other types of cell site modifications need to be made such as, for example, an antenna type change, an antenna orientation change, an antenna height change, an antenna tilt change, cell site relocation, sector addition, power change, etc.

A tool known as an automatic frequency planning (AFP) analyzer receives as its input a traffic forecast and an existing network configuration and outputs the number of additional frequencies that will need to be added to the network to meet the forecasted increased traffic demands. If the VCF tool indicates that network capacity for a given sector will be exceeded by a particular amount, the AFP analyzer will determine the number of channels that need to be added to a cell site to meet the increased demand. The ACP and AFP analyzers can be run simultaneously to create multiple combinations of changes.

Network designers also look at the costs associated with making an expansion or modification to the network. Typically, a certain amount of capital is available to make expansions or modifications and the designer must take this into account when determining what changes will be made. The cost information is available to the designers, so they know the costs associated with making various types of changes to the network. For example, if a designer can meet the increased traffic demand by adding additional channels rather than adding an additional cell site, the designer will often opt for the less expensive solution of adding more channels. Erlang constraints limit the number of frequencies, and thus the number of channels, that can be carried by a cell site. Such constraints may make it necessary to add another cell site as opposed to increasing the number of channels of the cell site. In addition, quality of service (QoS) is taken into account to ensure that whatever changes are made to the network enable the network to achieve a particular quality of service. For example, a QoS metric known as grade of service (GOS) is a measurement of the number of blocked calls that will be tolerated. The network designer may determine that adding additional channels rather than adding another cell site will result in an intolerable number of calls being blocked, and thus opt for the more expensive solution of adding another cell site.

A tool known as a QoS analyzer analyzes a network configuration generated by the ACP and/or AFP analyzers and predicts the network performance of the new network configuration. A tool known as a key performance indicators (KPI) analyzer works in conjunction with the QoS analyzer. The KPIs are metrics utilized to measure system performance. When the QoS analyzer predicts network performance, the KPI analyzer measures the predicted performance against the KPIs to determine the level of network quality performance.

Although tools such as those mentioned above are available to help network designers decide which solutions are the most cost effective, the decision making process is difficult because it is a subjective process that requires the designer to look at many different variables simultaneously and determine which solutions achieve the desired level of performance and are the most cost effective. As a result, the process of making these choices is prone to human error, and the solutions that are implemented may not be cost effective and/or may not achieve the best level of performance.

A need exists for a system that automates the process of determining the types of changes that can be made to a network to achieve a desired level of performance and, of those solutions, which are the most cost effective. By automating this process, it is possible to eliminate problems associated with implementing solutions that do not achieve the desired level of network quality performance and/or that are not cost effective.

SUMMARY OF THE INVENTION

The present invention provides a method and apparatus for simulating a modification to or expansion of a communications network and for determining whether the simulated modified or expanded network meets cost criteria.

In accordance with the preferred embodiment, the apparatus includes first logic that forecasts an increase in network traffic, second logic that simulates a modification to or expansion of the network based on the forecasted increase in network traffic and/or based on performance improvement criteria and/or coverage expansion criteria. Third logic of the apparatus determines whether the simulated modified or expanded network meets cost criteria.

The method of the present invention comprises forecasting an increase in network traffic, simulating a modification to or expansion of the network based on the forecasted increase in network traffic and/or based on performance improvement criteria and/or coverage expansion criteria, and determining whether the simulated modified or expanded network meets cost criteria.

The present invention also provides a computer program for automatically determining whether a modification to or expansion of a communications network meets cost criteria. The program comprises a first code segment for forecasting an increase in network traffic, a second code segment for simulating a modification to or expansion of the network based on the forecasted increase in network traffic and/or based on performance improvement criteria and/or coverage expansion criteria, and a third code segment for determining whether the simulated modification or expansion meets cost criteria.

These and other features and advantages of the present invention will become apparent from the following description, drawings and claims.

DETAILED DESCRIPTION OF EXEMPLARY EMBODIMENTS

Figure 1:
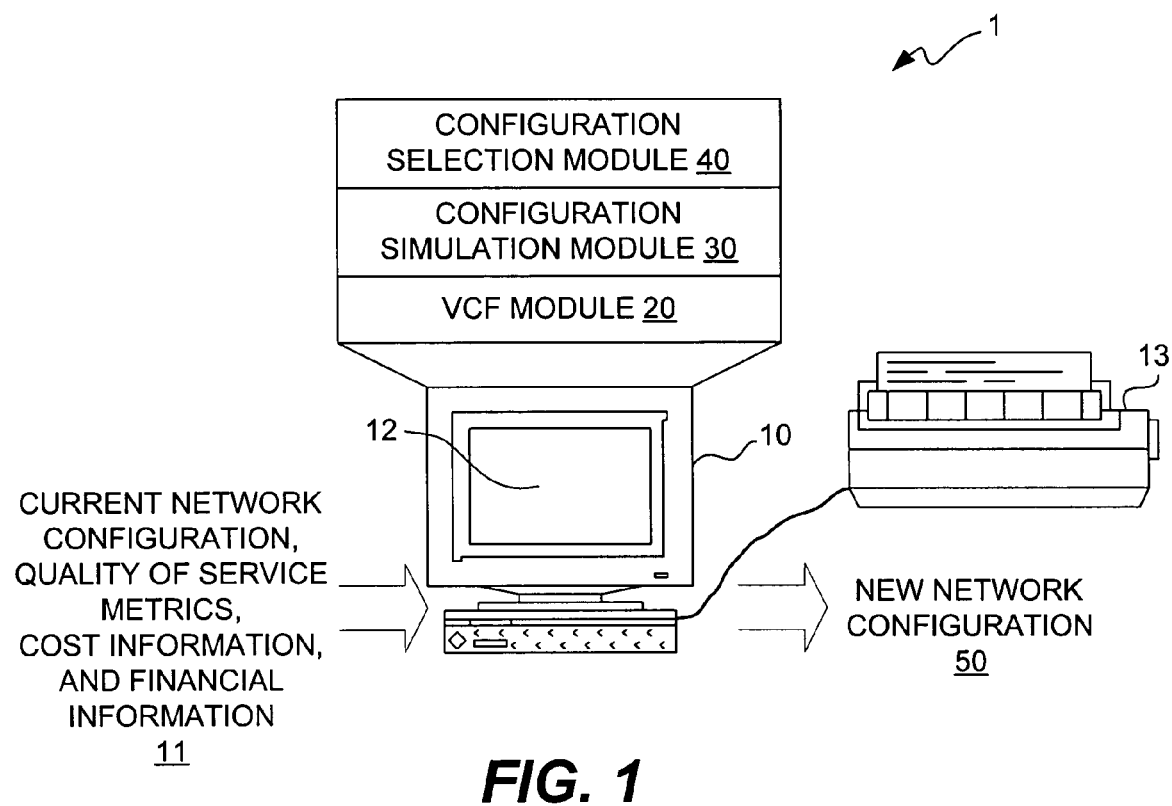
FIG. 1 is a pictorial illustration of the apparatus of the present invention in accordance with an embodiment.

FIG. 1 is a block diagram of the apparatus 1 of the present invention in accordance with the preferred embodiment. The apparatus 1 includes a computer 10 that is programmed to execute software modules 20, 30 and 40. The computer 10 receives input 11 in the form of current network configuration information, quality of service (QoS) metrics, cost information relating to the costs associated with making various types of additions or modifications to the network, and financial information relating to advertisements or promotions aimed at increasing the subscriber base. The computer 10 processes this information in accordance with a VCF software module 20, a network configuration simulation software module 30 and a network configuration selection software module 40 and selects a new network configuration 50 that is capable of handling the increased demand, that meets QoS goals and that is cost effective. Preferably, the selected new network configuration 50 is the most cost effective solution, as described below in more detail with reference to FIG. 2.

Figure 2:
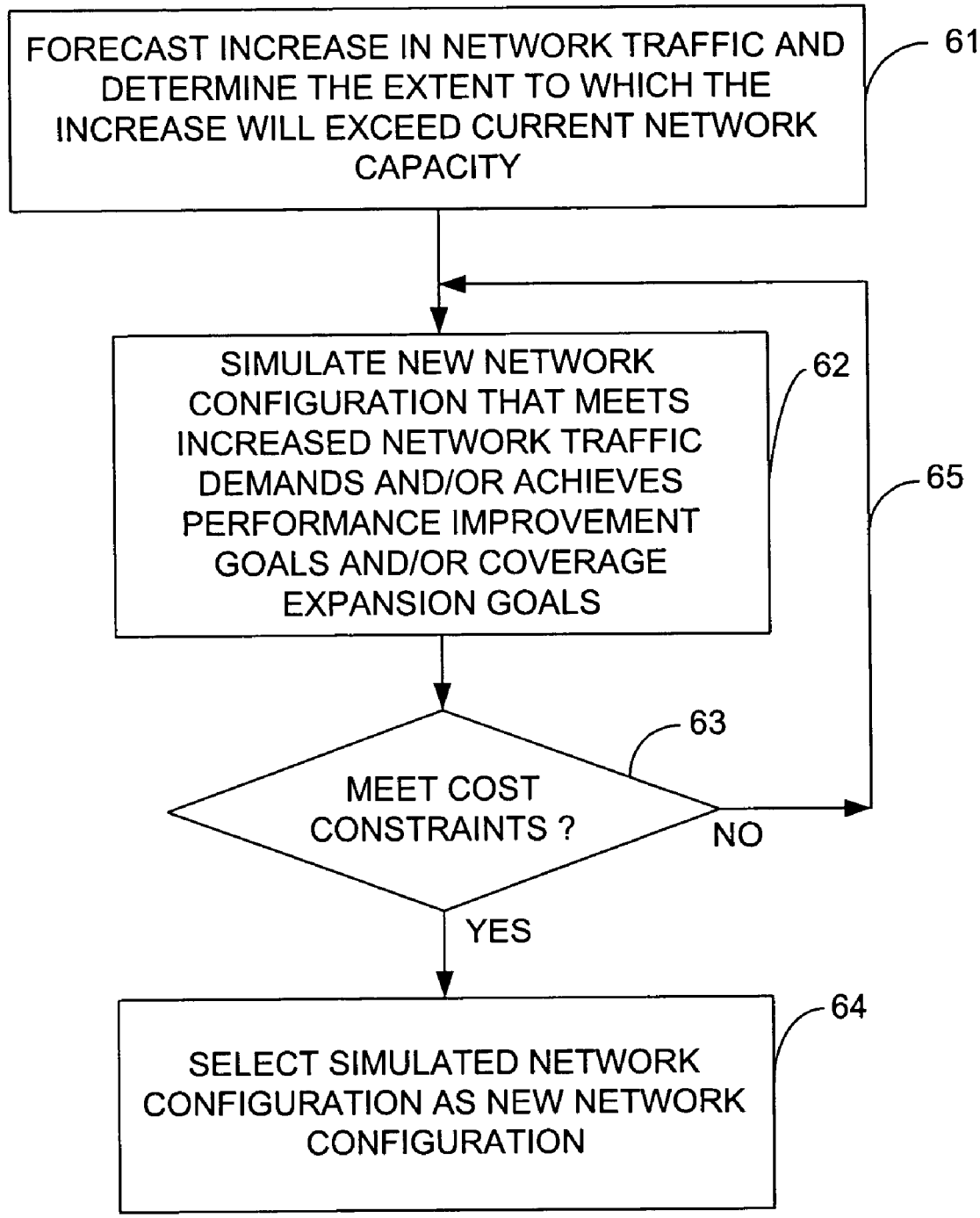
FIG. 2 is a flow chart of the method of the invention in accordance with an embodiment for determining whether a simulated network configuration meets growth demands, quality standards and cost constraints.

Each of the software modules 20, 30 and 40 performs a different function. These functions will now be described with reference to FIG. 2. FIG. 2 is a flow chart of the method of the present invention in accordance with an embodiment. The VCF module 20 performs the typical aforementioned functions of a VCF tool. The VCF module 20 uses information about the current network configuration to determine the limitations on the capacity of the current network. The VCF module 20 uses financial information, such as advertisements and promotions targeted at subscribers, for example, to forecast an increase in network traffic. Based on the projected increase in network traffic and the current capacity of the network, the VCF module 20 determines whether or not the increase will exceed network capacity, and if so, the extent to which the increase will exceed current capacity. The operations performed by the VCF module 20 are represented by block 61.

Once the extent to which the increase in network traffic will exceed current network capacity has been determined by the VCF module 20, the network configuration simulation software module 30 automatically modifies the current network configuration through simulation to meet the increased network traffic and/or that achieves performance improvement goals and/or coverage expansion goals, as indicated by block 62. There may be cases in which no increase in network traffic is predicted or anticipated, and yet performance improvements are needed or desired, such as, for example, a reduction in the number of dropped calls. In such cases, the simulation software module 30 is capable of simulating a modification to or expansion of the current network configuration to achieve the performance improvement. Similarly, there may be cases in which no increase in network traffic is predicted or anticipated, and yet an expansion in coverage is needed or desired to handle more users. In such cases, the simulation software module 30 is capable of simulating a modification to or expansion of the current network configuration to achieve the expansion in coverage.

The simulation software module 30 preferably is a combination of existing software tools that interact with each other to achieve a new network configuration. These tools preferably include the aforementioned ACP, AFP, QoS and KPI analyzers, which operate in conjunction with each other to determine whether any additional cell sites or additional frequencies are needed or whether any other network modifications are needed. Network modifications include adding new channels, adding new cell sites, changing the antenna type, changing the antenna orientation, changing the antenna height, changing the antenna tilt, relocating a cell site, adding a new sector, changing the power, etc. These analyzers work together to find the best solution that meets performance requirements.

Once the configuration simulation module 30 has simulated a new network configuration (i.e., a modification or expansion of the existing network configuration), the network configuration selection module 40 determines whether the new configuration meets cost constraints, as indicated by block 63. If so, the network configuration selection module 40 will select this modified or expanded network configuration as the new network configuration to be implemented, as indicated by block 64. If not, then the network configuration selection module 40 preferably will cause the simulation to be re-run so that a more cost effective configuration can be found, as indicated by the arrow 65 from block 63 to block 62.

Preferably, this process is repeated until the most cost effective solution is found. Each time a simulation is run, preferably a report is generated that lists the modifications to be made and a cost associated with each type of modification. The configuration selection module 40 uses this information to determine whether the new network configuration meets the cost target. A report describing the simulated network configuration and projected cost preferably is displayed on display 12 to the network designer. The computer 10 may be connected to a printer 13 to enable the report to be printed out by the designer.

Figure 3:
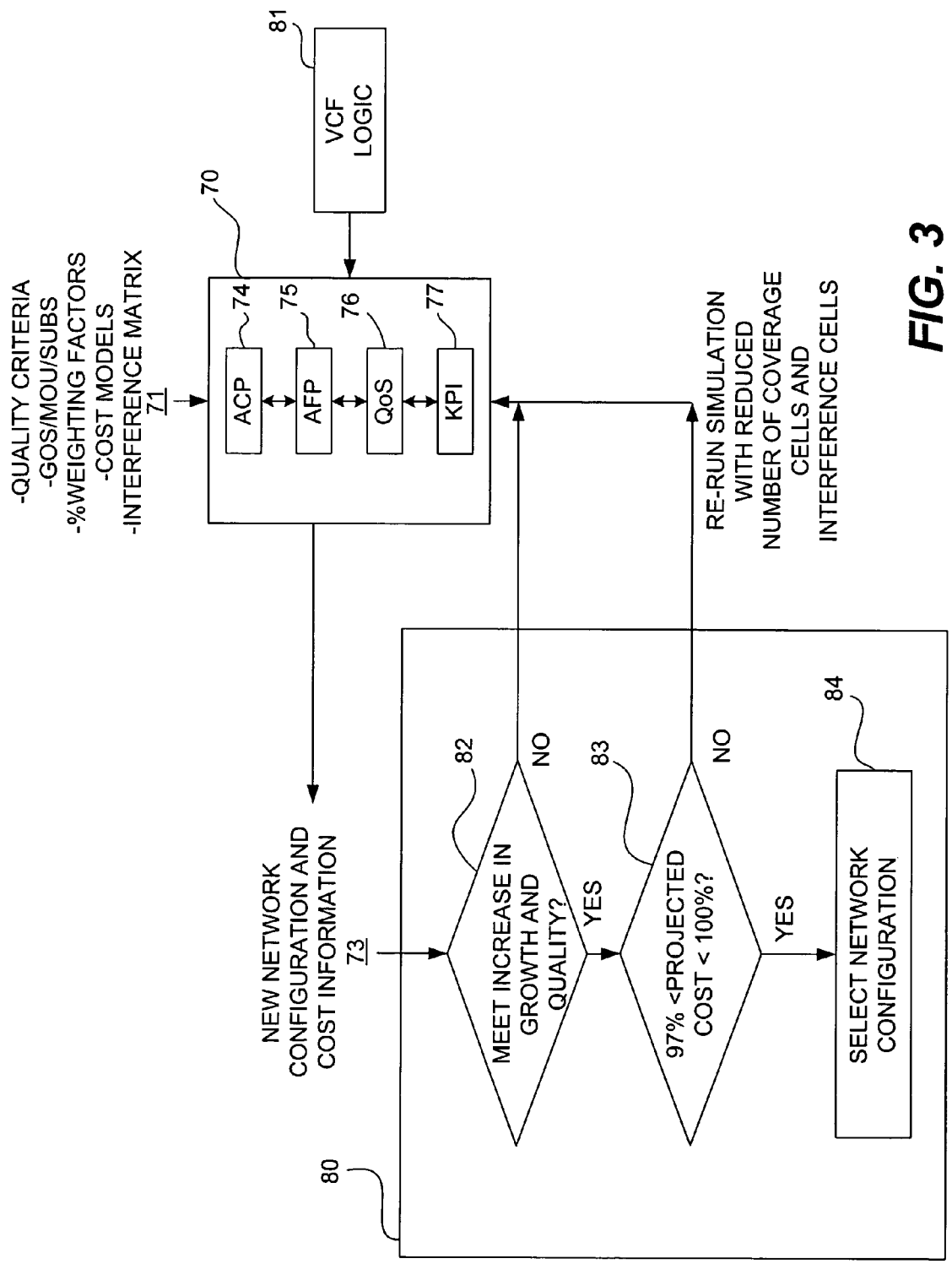
FIG. 3 is a functional flow diagram of the invention in accordance with an exemplary embodiment in which category weighting is utilized by the configuration simulation and selection software modules to obtain a new network configuration that meets quality and performance goals and cost constraints.

In order to enable the network configuration simulation software module 30 to simulate modified or expanded network configurations that achieve the desired levels of performance, preferably the module 30 is provided with priority information that prioritizes modifications or expansions. The network configuration simulation module 30 uses this priority information to generate a new network configuration that meets quality and performance goals. The network configuration simulation software module 30 performs the prioritization by weighting certain parameters more than others. FIG. 3 is a functional flow diagram of the invention in accordance with an exemplary embodiment in which weighting is utilized by the configuration simulation software module 30 to obtain a new network configuration that meets quality and performance goals and cost constraints. In accordance with this embodiment, the input 71 to the computer 10 (FIG. 1) includes QoS criteria, KPI metrics (e.g., grade of service (GOS)), percent weighting factors (i.e., prioritization), cost models that indicate the costs of the different types of modifications, and an interference matrix that indicates call interference zones in the network sectors.

The percent weighting factors indicate the amount of weight that should be given to certain network objectives, such as, for example, revenue initiatives, growth planning and quality of service. Revenue initiatives include information such as, for example, the number of capacity cell sites that should be deployed to help meet revenue initiatives, the types of network modifications that should be made to help meet revenue initiatives, the number of channels that should be added to meet revenue initiatives, and the number of base controller stations (BCSs) and mobile switching centers (MSCs) that should be added to help meet revenue initiatives. Growth planning includes, for example, the number of in-building cell sites that should be deployed to meet growth planning objectives, the number of in-fill coverage cell sites that need to be deployed to meet growth planning objectives and the number of coverage expansion sites that need to be deployed to meet growth planning objectives. Quality of service includes, for example, the number of interference cell sites that need to be deployed, customer retention goals that need to be met, and levels of voice quality that need to be achieved. By weighting the amount of emphasis that will be placed on revenue initiatives, growth planning, and quality of service, network strategies that lead to cost effective network improvement are made possible.

The input 71 is received by network configuration simulation logic 70, which includes logic for processing the input 71 in accordance with ACP, AFP, QoS and KPI algorithms performed by ACP logic 74, AFP logic 75, QoS logic 76 and KPI logic 77. The manner in which these algorithms typically process information and interact with each other is described above with reference to FIG. 1. The network configuration simulation logic 70 also receives the output of the VCF logic 81. The VCF logic 81 performs the VCF functions described above with reference to FIG. 1.

The output 73 generated by the network configuration simulation logic 70 includes a new network configuration (i.e., a modified or expanded network) and the cost of the modified or expanded network configuration. This output 73 is received and processed by network configuration selection logic 80. The network configuration selection logic 80 determines whether the new network configuration meets the forecasted increase in growth and QoS standards, as indicated by block 82. If not, the simulation is re-run by the simulation logic 80. If the forecasted increase in growth and QoS standards are met, then a determination is made as to whether the cost is within a particular range (e.g., between 97% and 100% of the projected cost) that is deemed to be optimum or acceptable, as indicated by block 83. If the cost is not within this range, the simulation is re-run. When the simulation is rerun, the network configuration selection logic 80 may inform the network configuration simulation logic 70 to make certain alterations to the network configuration to reduce the overall cost, such as, for example, reducing the number of coverage cell sites and interference cell sites. If a determination is made at block 83 that the cost is within the specified range, then the network configuration is selected as the new network configuration, as indicated by block 84.

It should be noted that the present invention has been described with reference to particular embodiments and that the invention is not limited to these embodiments. For example, the decisions represented by blocks 82 and 83 may be made in an order that is the reverse of the order shown. However, the order shown is preferred because it is the most efficient. If a network configuration does not meet growth demands and quality standards, there is no need to determine whether the configuration meets cost constraints. Other modifications can be made to the embodiments described herein and all such modifications are within the scope of the invention.

What is claimed is:

1. An apparatus for determining whether a modification to or expansion of a wireless communications network is efficient in terms of cost, the apparatus comprising:
   means for forecasting an increase in network traffic;
   means for iteratively simulating modifications to or expansions of the network based on one or more optimization algorithms employing weighting factors until a simulated modification to or expansion of the network is identified that meets at least one of the forecasted increase in network traffic, performance improvement criteria, or coverage expansion criteria in order to automatically generate an optimal network configuration, the means for iteratively simulating determines a cost of the identified simulated modification to or expansion of the network; and
   means for receiving information describing the simulated modified or expanded network and information relating to the costs associated with the simulated modification or expansion, and performing a network configuration selection algorithm and processes said information to determine whether the identified simulated modification or expansion of the network meets a predetermined cost range, if the predetermined cost range is determined to be met, then the identified simulated modification or expansion of the network is selected for implementation, if the predetermined cost range is determined not to have been met, the for receiving information informs the second logic to make specific alterations to the simulated modifications to or expansions of the network to reduce cost and run additional simulations.

2. The apparatus of claim 1, wherein the means for forecasting corresponds to a voice channel forecasting (VCF) algorithm being executed by a computer, the computer receiving information describing current capacity limitations of the network and information describing efforts directed at increasing a subscriber base of the network, the computer processing the information in accordance with the VCF forecasting algorithm to generate said forecast.

3. The apparatus of claim 1, wherein the means for simulating includes an automatic cell planning (ACP) algorithm being executed by the computer, wherein during the simulation, the ACP algorithm determines whether one or more cell sites need to be added to the network to meet the forecasted increase in network traffic.

4. The apparatus of claim 1, wherein the means for simulating includes an automatic frequency planning (AFP) algorithm being executed by the computer, wherein during simulation, the AFP algorithm determines whether one or more new channels need to be added to an existing cell site to meet the forecasted increase in network traffic.

5. The apparatus of claim 1, wherein the means for simulating includes a quality of service (QoS) algorithm being executed by the computer, wherein during simulation, the QoS algorithm determines whether simulated modifications to or expansions of the network meet quality of service criteria.

6. The apparatus of claim 1, wherein the means for simulating includes a key performance indicator (KPI) algorithm being executed by the computer, wherein during simulation, the KPI algorithm determines whether simulated modifications to or expansions of the network meet performance criteria.

7. An apparatus for automatically determining whether a modification to or expansion of a wireless communications network is efficient in terms of cost, the apparatus comprising:
    one or more processors;
    one or more memory communicatively coupled to the one or more processors, the one or more memory having stored therein computer-executable instructions to implement a program including:
    first logic that forecast an increase in network traffic; second logic that simulates a modification to or expansion of the network based on one or more optimization algorithms employing weighting factors until a simulated modification to or expansion of the network is identified that meets at least one of the forecasted increase in network traffic, one or more performance improvement criteria, or one or more coverage expansion criteria; and
    third logic corresponding to a network configuration selection algorithm being executed by a computer, the selection algorithm configured to receive information describing the simulated modified or expanded network and information relating to the costs associated with the simulated modification or expansion of the network, process said information to determine whether the simulated modification or expansion of the network meets the at least one of the forecasted increase in network traffic, the one or more performance improvement criteria, or the one or more coverage expansion criteria and wherein when the selection algorithm determines that the simulated modification or expansion of the network will not meet the at least one of the forecasted increase in network traffic, the one or more performance improvement criteria, or the one or more coverage expansion criteria, the second logic re-runs the simulation, wherein when the selection algorithm determines that the simulated modification or expansion of the network meets the at least one of the forecasted increase in network traffic, the one or more performance improvement criteria, or the one or more coverage expansion criteria, the third logic determines if the simulated modification or expansion of the network meets a predetermined cost range, if the predetermined cost range is determined to be met, then the simulated modification or expansion of the network is selected for implementation, if the predetermined cost range is determined not to have been met, the third logic informs the second logic to make specific alterations to the simulated modification to or expansion of the network to reduce cost and re-run the simulation.

8. A method for automatically determining whether a modification to or expansion of a wireless communications network is efficient in terms of cost, the method comprising:
    employing an apparatus to perform the following steps:
        forecasting an increase in network traffic;
        simulating a modification to or expansion of the network based on one or more optimization algorithms employing weighting factors until a simulated modification to or expansion of the network is identified that meets at least one of the forecasted increase in network traffic, performance improvement criteria or coverage expansion criteria; and
        determining whether the simulated modification or expansion meets a predetermined cost range, by executing a network configuration selection algorithm on a computer, the selection algorithm receiving information describing the simulated modified or expanded network and information relating to the costs associated with the simulated modification or expansion, the selection algorithm processing said information to determine whether the simulated modified or expanded network will be capable of handling the forecasted increase in network traffic and whether the simulated modification or expansion is within the predetermined cost range, the method further comprising:
    when the selection algorithm determines that the simulated modified or expanded network is capable of handling the forecasted increase in network traffic, determining if the simulated modification or expansion of the network meets the predetermined cost range, if the predetermined cost range is determined to be met, then the simulated modification or expansion of the network is selected for implementation, if the predetermined cost range is determined not to have been met, making specific alterations to the simulated modification to or expansion of the network to reduce cost and re-run the simulation.

9. The method of claim 8, wherein when a determination is made that the simulated modified or expanded network will not be capable of handling the forecasted increase in network traffic, performing the simulation step again to simulate a different modification or expansion to the network.

10. A non-transitory computer readable medium having stored thereon computer executable instructions for automatically determining whether a modification to or expansion of a communications network is efficient in terms of cost, the computer executable instructions comprising:
    a first code segment for forecasting an increase in network traffic;
    a second code segment for simulating a modification to or expansion of the network based on one or more optimization algorithms employing weighting factors until a simulated modification to or expansion of the network is identified that meets at least one of the forecasted increase in network traffic, based on performance improvement criteria, or coverage expansion criteria; and
    a third code segment which receives information describing the simulated modified or expanded network and information relating to the costs associated with the simulated modification or expansion, performs a network configuration selection algorithm, when the selection algorithm determines that the simulated modification or expansion of the network meets the at least one of the forecasted increase in network traffic, based on performance improvement criteria, or coverage expansion criteria, determining if the simulated modification or expansion of the network meets the predetermined cost range, if the predetermined cost range is determined to be met, then the simulated modification or expansion of the network is selected for implementation, if the predetermined cost range is determined not to have been met, making specific alterations to the simulated modification to or expansion of the network to reduce cost and re-run the simulation.

11. The non-transitory computer readable medium of claim 10, wherein the first code segment performs a voice channel forecasting (VCF) algorithm that receives information describing current capacity limitations of the network and information describing efforts directed at increasing a subscriber base of the network, and that processes the information to generate said forecast.

12. The non-transitory computer readable medium of claim 10, wherein during the simulation, the second code segment performs an automatic cell planning (ACP) algorithm that determines whether one or more cell sites need to be added to the network to meet the forecasted increase in network traffic.

13. The non-transitory computer readable medium of claim 10, wherein during the simulation, the second code segment also performs an automatic frequency planning (AFP) algorithm that determines whether one or more new channels need to be added to an existing cell site to meet the forecasted increase in network traffic.

14. The non-transitory computer readable medium of claim 10, wherein during the simulation, the second code segment also performs a quality of service (QoS) algorithm to determine whether the simulated modifications to or expansions of the network meet quality of service criteria.

15. The non-transitory computer readable medium of claim 10, wherein during the simulation, the second code segment also performs a key performance indicator (KPI) algorithm to determine whether the simulated modifications to or expansions of the network meet performance criteria.

16. The method of claim 8, wherein said forecasting is performed by a voice channel forecasting (VCF) algorithm being executed by a computer, the computer receiving information describing current capacity limitations of the network and information describing efforts directed at increasing a subscriber base of the network, the computer processing the information in accordance with the VCF forecasting algorithm to generate said forecast.

17. The method of claim 8, wherein said simulating includes executing an automatic cell planning (ACP) algorithm on a computer to determine whether one or more cell sites need to be added to the network to meet the forecasted increase in network traffic.

18. The method of claim 8, wherein said simulating includes executing an automatic frequency planning (AFP) algorithm on the computer to determine whether one or more new channels need to be added to an existing cell site to meet the forecasted increase in network traffic.

19. The method of claim 8, wherein said simulating includes executing a quality of service (QoS) algorithm on the computer to determine whether the simulated modifications to or expansions of the network meet quality of service criteria.

20. The method of claim 8, wherein said simulating includes executing a key performance indicator (KPI) algorithm on the computer to determine whether the simulated modifications to or expansions of the network meet performance criteria.

* * * * *